Figure 1:
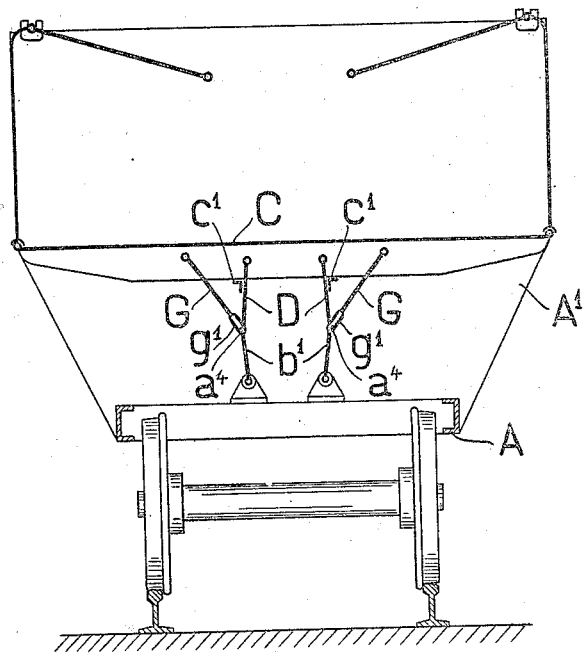

P. KRÜGER.
DUMPING CAR.
APPLICATION FILED MAR. 17, 1922.

1,423,121.

Patented July 18, 1922.

Inventor:
Paul Krüger,
By [signature]
Attys.

UNITED STATES PATENT OFFICE.

PAUL KRÜGER, OF ESSEN, GERMANY, ASSIGNOR TO FRIED. KRUPP AKTIENGESELLSCHAFT, OF ESSEN-ON-THE-RUHR, GERMANY.

DUMPING CAR.

1,423,121.     Specification of Letters Patent.     Patented July 18, 1922.

Application filed March 17, 1922. Serial No. 544,542.

*To all whom it may concern:*

Be it known that I, PAUL KRÜGER, residing at Essen, Germany, a citizen of the German Republic, have invented a certain new and useful Improvement in Dumping Cars, of which the following is a specification.

This invention relates to dumping cars having a floor tiltable towards either side about one of two laterally lying shafts. The object is to provide such a construction that the floor must always make the same movement to one side in the dumping movement.

Figure 2:
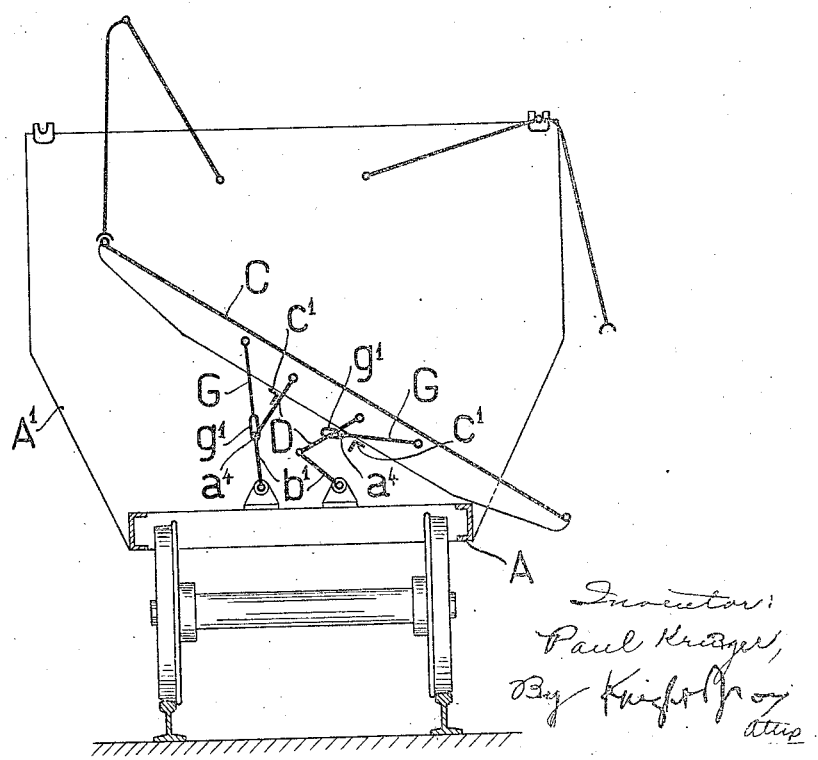

The drawing shows an example of the invention in a car having fixed end walls,

Fig. 1 being a diagrammatic cross-section of the car in the loading position, and Fig. 2 a similar view of the car in dumping position towards one side.

In these views, A is the under-frame of the car, $A^1$ the fixed end walls, C the bottom, $b^1$ the crank-arms supporting the bottom, and D the links pivoted to the bottom and connecting it to the arms $b^1$. Abutments $c^1$ are provided on the bottom for the links D, so that the latter can only turn inwardly when they engage said abutments. On each side of the central longitudinal plane of the car are additional links G, pivoted to the bottom at one end and having slots $g^1$ in their other ends by which they are guided on the pins $a^4$, mounted on the end walls $A^1$. The axes of said pins $a^4$ coincide, in the loading position (Fig. 1) with the axes of the pivots which connect the crank-arms $b^1$ with the links D.

When the car is to be dumped towards one side, for example to the right (Fig. 2), the bottom C turns, by its own weight and that of the load, on those pivots which connect the crank-arms $b^1$, lying to the left of the central longitudinal plane, with the corresponding links D, pivoted to the bottom. The lefthand links G turn about the corresponding pins $a^4$, the axes of which coincide with the pivotal axes of the bottom. On the left side, therefore, the position of the links G remains unchanged relatively to the bottom C, while the righthand links G move on the pins $a^4$, through their slots $g^1$, and change at the same time their position relatively to the bottom C.

In constructions in which the bottom of the dumping car is connected only to the underframe by means like the parts D, $b^1$, it may happen that the bottom turns on the pivots connecting it with the links D and not on those connecting the links D with the crank-arms $b^1$. But this cannot occur in the present construction, since the bottom C is prevented by the links G from turning on the pivots connecting the links D with the bottom, so that it is only possible for it to turn on the pivots connecting the crank-arms $b^1$ with the links D.

I claim:

1. In a dumping vehicle a body provided with end walls, a bottom tiltable to either side about laterally disposed axes and crank-arms located on each side of the central longitudinal plane, and links positively connecting said bottom to said end walls.

2. In a dumping vehicle the combination with a body formed with end walls, and a bottom tiltable to either side about crank-arms disposed on each side of the central longitudinal plane of the vehicle, of links positively connected to said bottom and to said end walls, said latter connection comprising a pin and slot.

The foregoing specification signed at Essen, Germany, this 9th day of February, 1922.

PAUL KRÜGER.